United States Patent
Lifshitz et al.

(10) Patent No.: US 8,189,210 B2
(45) Date of Patent: May 29, 2012

(54) METHOD AND SYSTEM FOR SIMULATING THE OPERATION OF AN IMAGE CONVERSION DEVICE

(75) Inventors: Lior Lifshitz, Mevasseret Ziyon (IL); Raphael Wiesenberg, Ramat Gan (IL)

(73) Assignee: Dot Gain Ltd., Mevasseret Ziyon (IE)

( * ) Notice: Subject to any disclaimer, the term of this patent is extended or adjusted under 35 U.S.C. 154(b) by 787 days.

(21) Appl. No.: 12/364,582

(22) Filed: Feb. 3, 2009

(65) Prior Publication Data

US 2009/0219557 A1  Sep. 3, 2009

(30) Foreign Application Priority Data

Feb. 5, 2008 (IL) .................................... 189300

(51) Int. Cl.
- G03F 3/10 (2006.01)
- G03F 3/08 (2006.01)
- B41J 29/393 (2006.01)
- B41J 2/15 (2006.01)

(52) U.S. Cl. ......... 358/1.13; 358/527; 358/529; 347/19; 347/40

(58) Field of Classification Search .................. 358/527, 358/529; 347/19, 40
See application file for complete search history.

(56) References Cited

U.S. PATENT DOCUMENTS

| | | | |
|---|---|---|---|
| 4,349,835 A * | 9/1982 | Horiguchi et al. | 358/527 |
| 2001/0034592 A1 | 10/2001 | Herman | |
| 2005/0083364 A1 * | 4/2005 | Billow | 347/19 |
| 2007/0147928 A1 | 6/2007 | Oyumi et al. | |

FOREIGN PATENT DOCUMENTS

| | | |
|---|---|---|
| EP | 0350870 | 1/1990 |
| JP | 2005157791 | 6/2005 |
| JP | 2006099637 | 4/2006 |
| WO | WO 2007071826 | 6/2007 |
| WO | WO 2008007746 | 1/2008 |

* cited by examiner

Primary Examiner — King Poon
Assistant Examiner — Akwasi M Sarpong
(74) Attorney, Agent, or Firm — Martin Fleit; Paul D. Bianco; Fleit Gibbons Gutman Bongini & Bianco PL

(57) ABSTRACT

A method is provided for simulating the function of an image conversion device, comprising steps of reading input image data, recording the physical transformations of the base elements in at least one process step, emulating a predetermined number of processes, recording the final states of the base elements, collecting the base elements states following the last simulation step, transforming said collection into the simulation file and printing or displaying said simulation file. A system for implementing the method is also provided.

28 Claims, 11 Drawing Sheets

METHOD AND SYSTEM FOR SIMULATING THE OPERATION OF AN IMAGE CONVERSION DEVICE

FIELD OF THE INVENTION

The invention pertains to simulation devices, more particularly to imaging system simulators.

BACKGROUND OF THE INVENTION

An image conversion device is a physical device that converts one type of image to another. The image conversion device may be a device used for printing a real life or digital image on a substrate (e.g. a printer) or recording an image on screen (e.g. a display monitor) or transferring a physical image into digital means (e.g. a camera). Image conversion devices have been developed for many years for many applications. These devices employ a technology to transform an image from one form of representation to another. The technology may consist of various mechanical, chemical, electronic, and software means. The objective of the imaging is to obtain a transformed image that would represent the original image as accurately as possible.

Each imaging technology has its own process to produce the image. This process, when operating well (within predetermined tolerances), will produce the ideal image for the technology, as designed by the engineers. However, the process may not work within the tolerance and then the image will be distorted. The distortion may take many embodiments, and the image will be far from ideal.

In the process of designing an industrial product, and specifically, an image conversion device, there is often a need for simulating the operation of the product in order to be able to anticipate its performance without actually implementing it. By simulating an image conversion device it is possible to carry out the transformation of the input image and create an output image that will very much resemble the real output. This simulation may be carried out by software means.

By using a simulation, the designer of an image conversion device can test the putative design and check how the device will work under different working conditions. This process is very important in the design process as it saves a substantial amount of time and money on the design and manufacture of a model of the product. It makes possible the testing of the device under conditions that are difficult to realize on the real device.

An inkjet printer is an example of an image conversion device that uses a complicated process to transform a digital image into a printed image on a substrate. This process consists of software data processing, followed by an electro mechanic system that ejects ink drops onto the substrate in such a distribution so as to create an image on the substrate. The technological process of an inkjet printer is very complicated, and it is very difficult to link between various process parameters and the appearance of the printed image. A proper simulator can make this link by simulating the complete process.

PRIOR ART

At present there are no comprehensive simulators for image conversion devices. There are various tools that simulate the color and the general appearance of the image conversion device. However, these tools only simulate the ideal image produced by the device. They do not take into account the actual process employed by the device let alone the process variations and deviations. These tools take the input image and run it through a process of their own producing an output that resembles the image conversion device. They do not however, simulate the actual imaging process of the real image conversion device.

PCT/JP2007/063923 discloses a method useful as a proofing system for a print press. It does not analyse the process or the digital output. It only applies global color transformations to the image and focuses on color matching.

In JP2005157791, a printer simulator is described for a laser printer, the simulator receiving simulation signals from the laser printing model simulation unit. The elements of operation of a laser printer are substantially different from that of other image conversion devices. The transformations of the image are treated globally and not in the base elements level.

US20070147928 describes a simulator for control systems in laser printers which interfaces with existing printers to replace some of the control circuits of the printer, and no simulated output of the image is provided.

JP2006099637 describes a tool for the evaluation of printing time and general quality and is not a comprehensive solution for other important parameters.

US2001034592 teaches the operation of a specific simulation application suitable for a flexographic printer including the treatment of elements like the dots size and color. It focuses on working with flexographic printers and therefore can not be applied to other printing methods. Digital processes are not taught in this patent nor is the tracing of base elements described.

WO2008007746 discloses a simulator for an Offset (conventional) printer. The method compares a simulated image with an original image for the purpose of modifying some color transformations in the printer in order to achieve a match. The simulation is based on global transformations, i.e. the same transformations are applied to all image pixels, thus obtaining mainly the color output of the press.

WO2007071826 teaches improvements of color quality in conventional printing. A scan of the printer output is used, and not a simulation.

EP0350870 and U.S. Pat. No. 4,349,835 teach methods for comparing simulated with original images and modifying the reproduction conditions in order to obtain a match. The simulation is done by global color transformations.

A longfelt need therefore exists to provide methods and means of simulation of an image conversion device by representing its complete process by software and hardware means and producing an output image that is very similar to the image of a "real life" image conversion device. Furthermore, a longfelt need exists to simulate the complete actual process of an image conversion device, especially an inkjet printer by using the principle of identifying and tracing base elements of the various process parameters involved. Moreover, a long felt need exists to apply a unique transformation to each of the base elements, so that the simulation duplicates all image attributes, not only color.

SUMMARY

The object of the invention is to provide a method with enabling software and hardware for the simulation of an image conversion device, by closely following the internal processes taking place within the device.

Digital image conversion devices manipulate images that are digital by nature. Unlike the continuous character of appearance of tones, colors and images in nature, a digital image consists of small, discrete picture elements. The plurality of these elements makes up the digital image. The smaller these elements are, the finer the image is. Within one image these elements may vary in size, tone and color. Nevertheless, they are discrete and may be treated as the basic building blocks of the image. The process that takes place within the device is usually to manipulate and transform these elements from one form to another.

The current invention simulates the image conversion device by treating each of the picture elements individually. By transforming and recording each of them in accordance with the process of the image conversion device, it generates the complete output image of device, from its fundamental elements.

The simulation process consists of the following steps:
1. Preparing for the simulation: definition of the device and the process. This stage is carried out off-line as a pre-process preceding the actual simulation.
2. Simulating the device operation:
   a. Reading the input of the imaging process
   b. Carrying out simulations and emulations, to trace the base elements of the system, according to the operation of the device.
   c. Producing an output image.

Each of the simulation steps has its own processing parameters. These parameters may be modified to provide an infinite number of variations of the image conversion device operation. These variations may be planned, corresponding to parameters in the real device operation, or accidental, corresponding to unintended errors and deviations of the real device.

The final simulation image may be viewed on screen or as a hard copy in order to gain both a qualitative and quantitative impression on the operation of the simulated image conversion device.

DETAILED DESCRIPTION OF THE INVENTION

In the following description, various aspects of the invention will be described. For the purposes of explanation, specific configurations and details are set forth in order to provide a thorough understanding of the invention. However, it will be also apparent to one skilled in the art that the invention may be practiced without specific details presented herein. Furthermore, well-known features may be omitted or simplified in order not to obscure the invention.

An imaging conversion device transforms an input image to an output image by handling small picture elements called pixels. The pixels are the smallest entities of the image. Their attributes in an image are the position and the color. Both of these attributes are transformed either in a computer memory or in a physical process. In the current invention all transformations are carried out in a computer memory as a simulation to the real process.

The first part of the simulation is the characterization of the imaging conversion device structure and operation. This is done using a series of parameters providing the following information:
1. General structure and operation of the device
2. Specific operation mode for the coming session
3. The actual operation parameters of a real device, including errors and deviations from the nominal parameters.

While designing a simulator for a specific image conversion device, it is necessary to identify the process steps and the base elements. These elements are then referred to during the simulation process.

Figure 1:
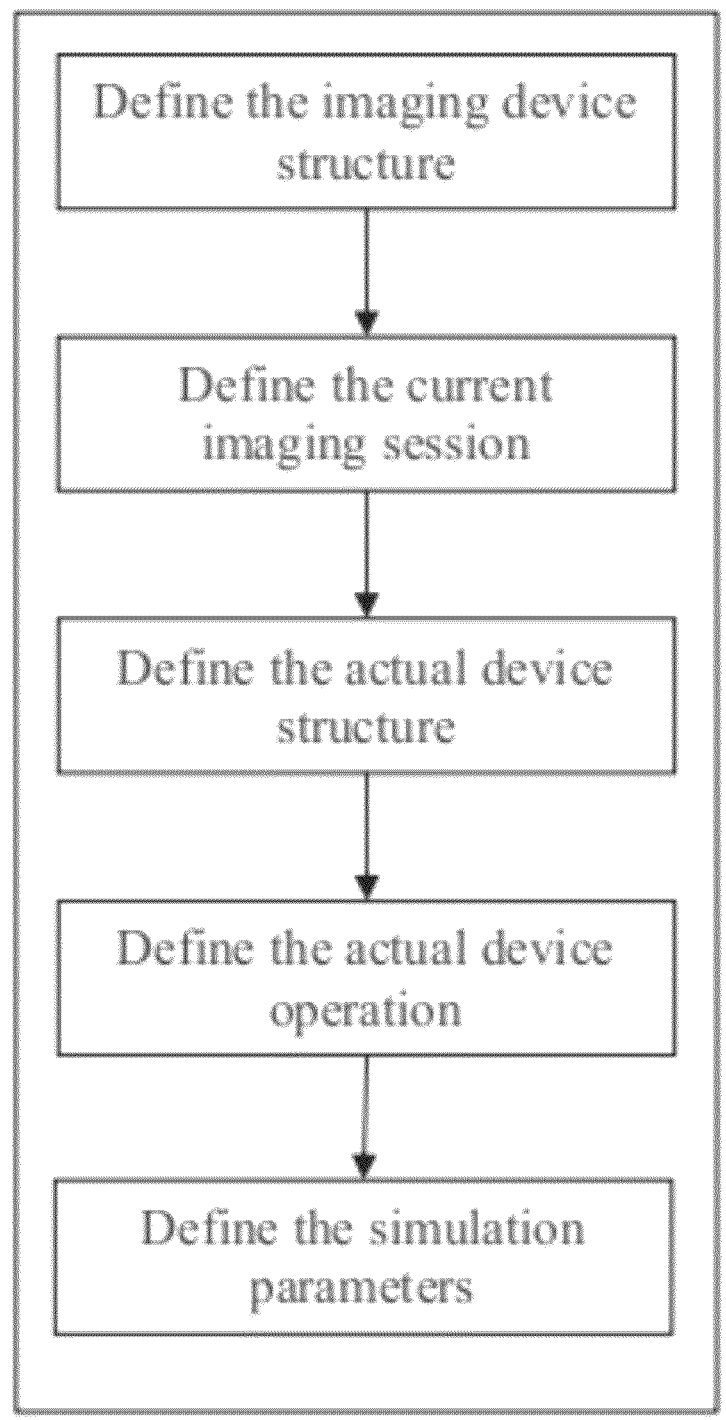
FIG. 1 is a flowchart of the preparation of the simulation.

Reference is now made to FIG. 1 which is a schematic diagram of preparation steps employed prior to the simulation. The imaging device structure is defined, the current imaging session is defined, the actual device structure is defined and the actual operation of the device is defined.

Figure 2:
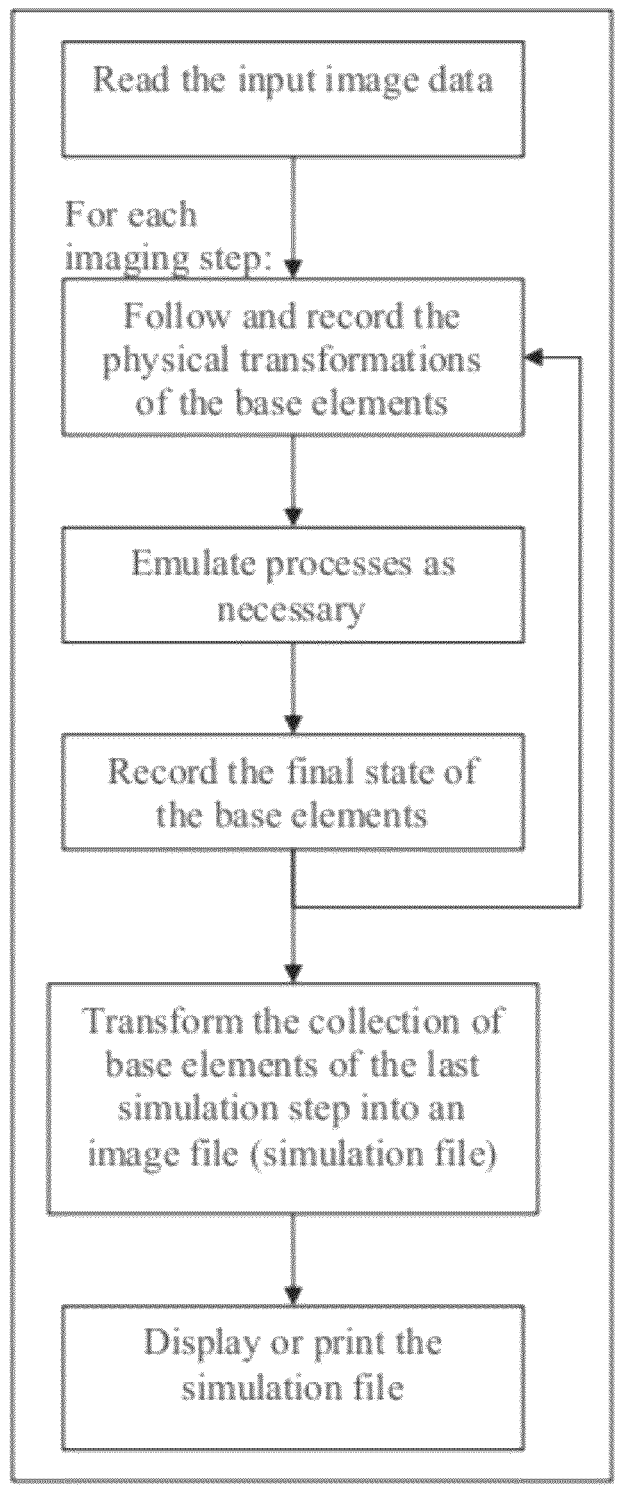
FIG. 2 is a flowchart of the simulation

Reference is now made to FIG. 2, schematically illustrating steps which are described below:

The simulation process starts with the input data of the real process. This input can be a digital image in the case of a printer, or a representation of real-life scenery in the case of an input device (scanner, camera etc.). The simulator then transforms the input image according to the real process. Some process steps, e.g. software transformations, may not be simulated, but are emulated to give the same output as the original process. The simulation of a process step involves the following elements:
1. Read input data attributes, i.e.: base elements attributes: position, color and other attributes as applicable for the current process step.
2. Transform the base elements, thus changing their attributes.
3. Record the base elements new attributes so they can be used for the next step.

The next process step uses the output of the previous step to perform additional transformation. The resolution of the simulation process is normally higher than the original data or than the image conversion device resolution. This is the outcome of the analog nature of the physical process. For example, the position of the pixels in a digital image is restricted by the image resolution. However, in a simulation of the real physical process the resolution should be much higher since it is necessary to trace and record sub pixel deviations. Similarly, color and time resolutions are higher than the nominal values of the image conversion device. It is an important aspect of the present invention that the simulation resolution is higher than the "natural" resolution of the simulated process. Importantly and surprisingly, methods and means are provided by the invention, to select and adjust the simulation resolution according to quality and performance considerations. Similarly, colour depth of the simulation file is also a flexible parameter which can be used to enhance the accuracy of the simulation at the expense of the simulation performance time.

To perform the transformations the simulator uses the device structure and operation parameters as defined previously in the characterization phase. If the parameters are the nominal parameters of the device, the simulation will produce similar results to the theoretical device. However, if real structure and process parameters are used, the output of the simulation will demonstrate the effect of these parameters in the real device.

The base elements are transformed from one process step to another, until a final image can be composed from the last set of attributes. This image represents the output of the image conversion device, which may be a hard copy—for a printing device, a screen image—for a display device or an image file—for a capture device. The simulation image provides an accurate representation of the output image.

The term "Simulation file" hereinafter refers to the image file that has been generated by the simulation process.

DESCRIPTION OF THE PREFERRED EMBODIMENT

The best exemplary mode of the present invention contemplated by the inventor is set forth herein: This embodiment is a simulator of an inkjet printer.

Inkjet printers are devices that print images onto substrates by ejecting ink droplets at specific positions on the substrate. An inkjet printer normally has the following building blocks:

- A data processing unit that receives an input image file and transforms it into a data structure that is compatible with the print heads interface, spatial layout and method of operation. This unit is usually implemented in software.
- A print head driver that receives the data from the data processing unit and feeds it to the print heads. This unit is implemented in hardware.
- A mechanical system carrying the print heads in a special arrangement—the head carrier.
- A mechanical system carrying the substrate to be printed on—the substrate carrier.
- A motion system that moves the head carrier into its printing position relative to the substrate carrier. The motion can be applied to either the head carrier or the substrate carrier. This system is sometimes called the slow axis motion system. It should be noted that the slow axis motion may be continuous motion or stepwise, or no motion at all.
- A motion system that moves the head carrier in a scanning motion relative to the substrate carrier. During this motion drops are ejected towards a substrate to form the printed image. This system is sometimes called the fast axis motion system
- A control system that synchronizes the motions and the drop ejection.
- An ink supply system that continuously feeds the print heads with fresh ink
- A service system that is responsible to keeping the print heads in a good working condition.
- An image fixation (drying) unit
- A general software application that controls the printer and communicates with the operator via a user interface (software or other)

The image (print) generation workflow of an inkjet printer:
1. Read an original image data
2. Process the image data according to the data interface of the print heads and the printing flow.
3. Transfer a print pass data to the print heads electronic driver
4. Apply a relative motion between the head carrier and substrate carrier along the slow axis to the start position of the coming print pass.
5. Apply a relative motion between the head carrier and substrate carrier along the fast axis to realize the print pass. During the travel drops are ejected towards the substrate
6. The drops fly towards the substrate. When they land on it they interact with the substrate to form a part of the image.
7. Repeat steps (3-6) until the whole image is reproduced on the substrate.

Figure 8:
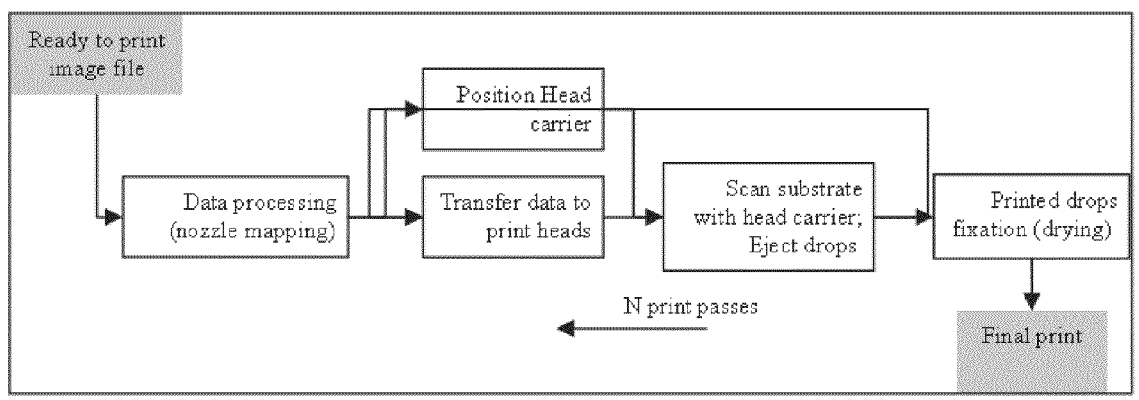
FIG. 8 is a description of the printing workflow of an inkjet printer

Focusing on the printing path, the workflow of the printer is illustrated in FIG. 8. illustrating the Inkjet printer printing path ViPrint is a software implemented method and system which covers the operation of all the relevant printer systems during the course of printing. Some systems are simulated while others are emulated. While a simulation is a close imitation of a process, taking into consideration the details of the process, emulation does not attempt to imitate a process, but rather to take the same input and produce the same output. The internal mechanism for achieving this can differ from the original mechanism.

Figure 3:
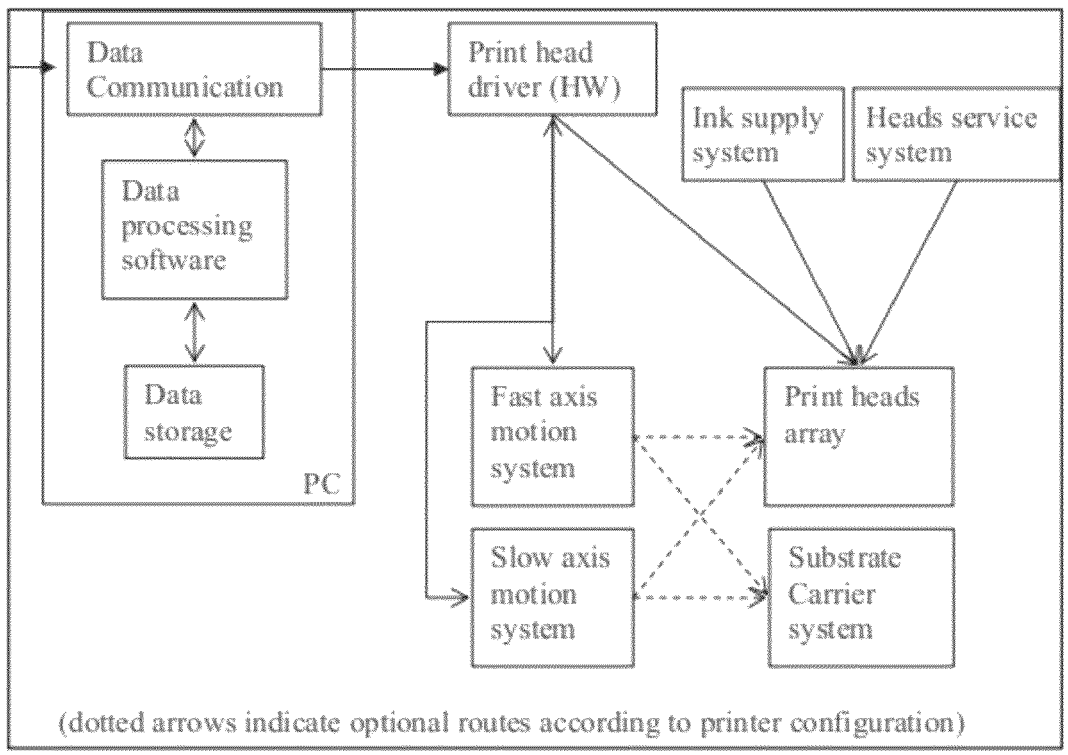
FIG. 3 is a block diagram of the operational layout of an inkjet printer

The printer schematic layout is illustrated in FIG. 3.

In the simulation of an inkjet printer, the printing process is divided into several process steps:
1. Data input and processing.
2. Motion along the two axis until drop ejection
3. Drop flight between the print head and the substrate
4. Drop interaction with the substrate.

Figure 4:
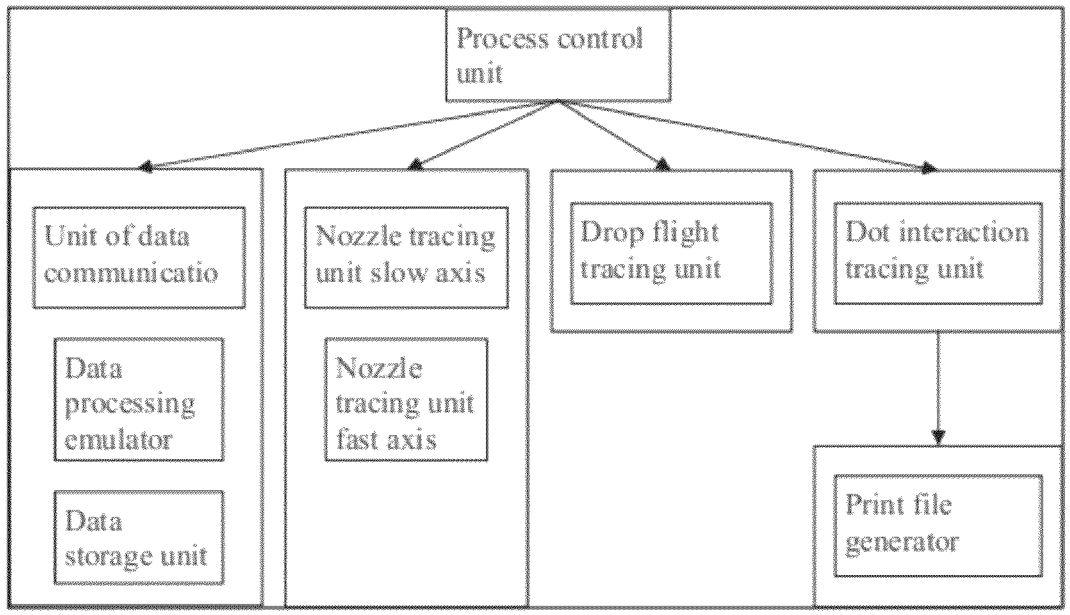
FIG. 4 is block diagram of the operational layout of the simulator

The schematic layout of the inkjet simulator is illustrated in FIG. 4

Each process step is handled differently in the simulation:
1. Data input and processing is emulated to take the same input and produce similar output as the real printer.
2. The motion along both axes is simulated in the software, so that the position (XYZ coordinate) of each individual nozzle is known as a function of time.
3. The flight of each drop is simulated so that the trajectory, landing time and landing position on the substrate are known with a high degree of precision.
4. The interaction with the substrate is simulated to give the final position, shape and color of the dot on the substrate.

The workflow of the printer simulator is according to the principles set above:
1. Read the original image data (same as for the real printer)
2. Process the image data according to the data interface of the print heads and the printing flow.
3. Transfer a print pass data to a data structure representing the print heads array
4. Simulate the relative motion between the head carrier and the substrate carrier along the slow axis to the start position of coming print pass. It should be noted that the slow axis motion may be continuous motion or stepwise, or no motion at all.
5. Simulate the relative motion between the head carrier and the substrate carrier along the fast axis. Record the XYZ position and velocity of each nozzle in the print head array at each time drops are ejected.
6. Calculate the drops trajectory as they fly from the nozzles towards the substrate. Record the landing point of each drop on the substrate.

7. Assume a certain ink-substrate interaction model and work out the final position, shape, size and color of the ink drops on the substrate, at the time the ink is fixed on the substrate.
8. Repeat steps (3-7) until the whole image is reproduced on the substrate.
9. Use the final data from step(s) 7 to generate an output image file showing the final appearance of the ink on the substrate, making up a complete image from individual dots. Store the output image file on disk, allowing the user to display or print it.

The base for each of the simulations is the theoretical and optimal process step functionality. However, any deviation from the theoretical behavior can be expressed in the simulation, influencing the output of each of the process steps. Thus it is possible to obtain a simulation of the printed image which is very close to real life printing.

The structure of the printer, as well as each of the process steps has a set of parameters defining its functionality. The parameters are set in advance and kept in a database. The simulator uses the database parameters for the emulation and simulation of all printer functions as necessary. In the specific embodiment described here, data processing is emulated to produce the same output as the printer data processing (steps 2-3 in the simulation workflow), while the drops lay down is simulated according to real life parameters, giving a potentially distorted prints (steps 4-7). This specific embodiment is by no means a limitation on the scope of the invention.

Two examples of the use of the printer parameters are described below (FIG. 4):
1. Nozzles coordinates. The coordinates of each of the nozzles are used to correctly process the data for the print passes. This data processing is done in the real printer by software or hardware, and is emulated in the simulator by software. However, the actual nozzles coordinates may deviate from the nominal values. This data can be fed to the simulator and be used during the virtual printing. Thus the simulation image will differ from the ideal image, looking very much like the image printed under the same conditions of nozzle deviations.
2. Slow axis motion steps. As described above, the motion of the slow axis is often done in steps. The steps are arranged in a cyclic manner. For example: there are 5 steps that are repeated 10 times across the printed area. The real printer uses this print steps data for its data processing and for controlling the slow axis motion. The simulator uses this data for the emulation of the data processing and for simulating the slow axis motion. However, it often occurs that the actual motion is different from the planned motion. While the printer data processing unit uses the planned print steps, the actual steps are slightly different. As a result, the drops are misplaced on the substrate, causing the image to appear different than planned. The simulator uses both the nominal data for its data processing emulation, and the actual data for simulating the slow axis motion. As a result, the simulated image looks very much like the real "faulty" image of the printer, not like the ideal image.

A preferred implementation of the invention is the ViPrint, an inkjet printer simulation method program. The program enables an operator to simulate the operation of an inkjet printer without having the printer at hand. The output of ViPrint is an image file that looks very much like the output of a real printer, simulating its ideal and real-life operation.

The operation of ViPrint involves a good knowledge of inkjet printers' structure and operation. ViPrint is configured by feeding it with all the structural and operational parameters of the real printer.

ViPrint is a software application that can be installed on a PC under the Windows operating system. It requires a standard PC, however its operation and performance depend on the performance parameters of the PC, e.g. Processor structure and speed, RAM volume, hard disk volume etc.

The operation of ViPrint involves four steps:
Defining ViPrint operation parameters
Selecting the configuration for the coming session
Running the simulation
Examining the results The definition of ViPrint operation parameters is done by editing special XML files using the ViPrint editor. This action is done in advance and all the necessary xml files are prepared for the coming session. These xml files act as the database storing all of ViPrint operating parameters Prior to running the simulation, the proper xml configuration files are selected, defining the ideal and actual printer structure and printer operation for the coming session.

Figure 9:
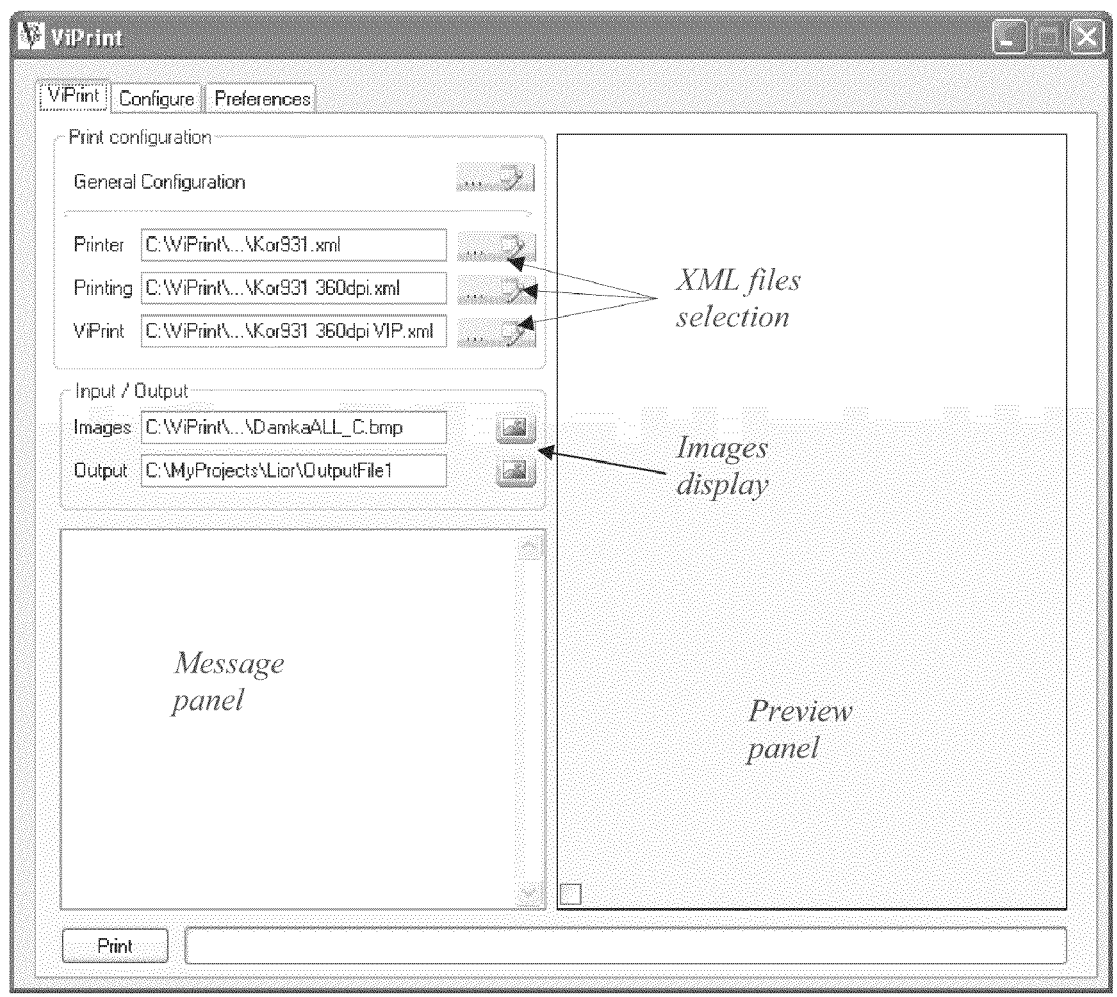
FIG. 9 is a screen capture of the main screen of ViPrint printer simulation software

A simulation session is initiated by pressing a Print button in the main screen of the application (FIG. 9). The process is completed when the output simulation file is created, indicated by a proper notification on screen.

The output file may be viewed on screen using a standard image viewer. It can also be printed on a high resolution (photo) desktop printer.

Figure 5:
FIG. 5 is a highly magnified photographic representation of an original image
Figure 6:
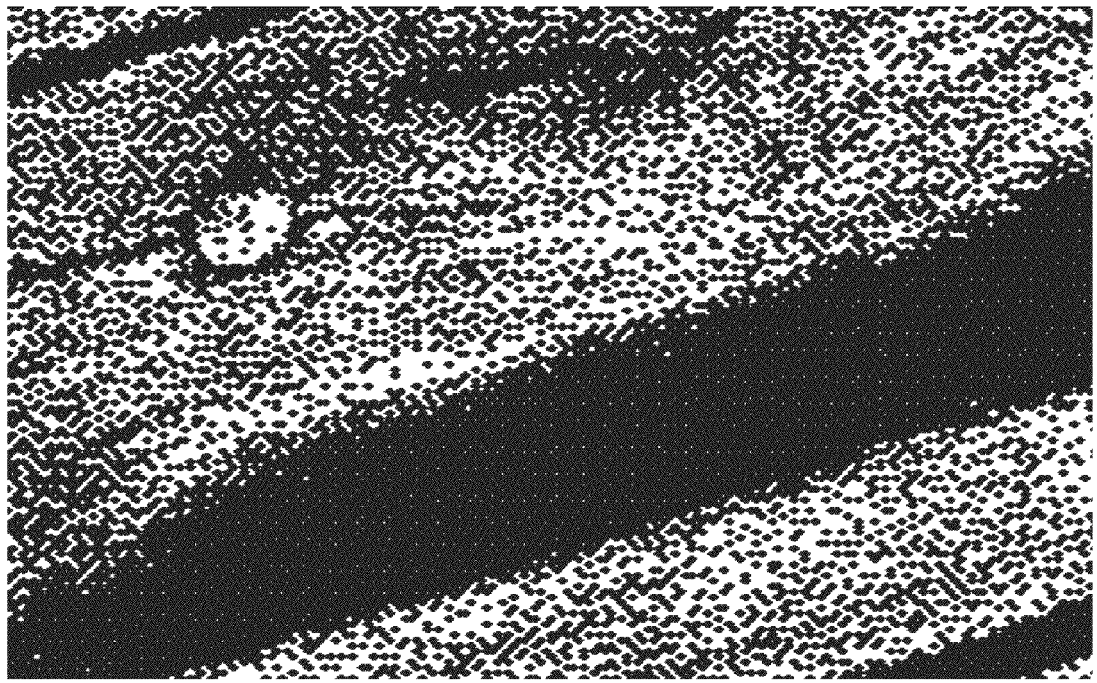
FIG. 6 is a highly magnified photographic representation of the simulated image showing a dot size and shape effect
Figure 7:
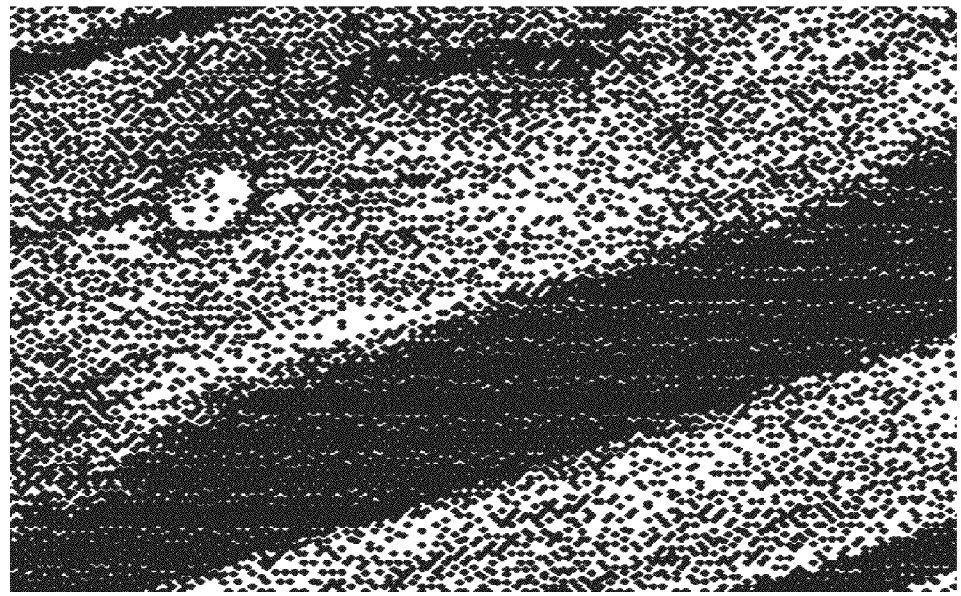
FIG. 7 is a highly magnified photographic representation of the simulated image showing a print head misplacement effect.

Sample image files of ViPrint demonstrate its advantages (FIGS. 5-7): FIG. 5 illustrates an input file both for ViPrint and for a normal printer. This is a standard image file, characterizing a "ready to print" file of many inkjet printers. It is highly magnified, showing each pixel as a small square. Reference is now made to FIG. 6, which is an output image of ViPrint, demonstrating a standard input with realistic dot size and shape. The shape of the dot in this figure demonstrates the higher resolution of the simulation relative to the original image (FIG. 5). It is the aforesaid ratio which is hereinafter referred to as the Resolution Factor. Reference is now made to FIG. 7 which is also an output image of ViPrint, but here demonstrating a shift in the position of one print head within the printer head assembly. This image (FIG. 7) is highly distorted compared to the original image (FIG. 5)

It is a core principle of the invention to provide methods and means for determining the resolution factor and adjusting it according to the requirements of the simulation. It is understood by a person skilled in the art, that the resolution factor also affects the performance of the simulation, since the higher the resolution demanded, the more data is handled, and therefore the longer the simulation operation will take.

Examples of the novelty and utility provided by the invention in enabling resolution factors to be adjusted by the operator include:
1. When experimenting with the effects of missing nozzles, the Resolution Factor can be 1, i.e. the printer and the simulation resolutions are the same.
2. A different type of experiment would be the effect of minor deviations in dot placement. Even a 10 micron deviation for a 300 dpi printer can have a pronounced visual effect. In such a case the simulation must be sensitive to 10 micron deviations and therefore for a 300 dpi (about 85 microns per pixel) printer, a Resolution Factor of about 10 is required.

Detailed Operation

The main screen (FIG. 9) of the application is used to define the configuration files for the coming simulation session, and to run the simulation. During the simulation the progress of the process is displayed as well as status messages. From the main screen there is access to the input and output files of the simulation.

The configuration files of ViPrint have a fixed structure. They are divided to 3 sections:
- The definition of the printer structure
- The configuration of the printer for coming printing session
- The characterization of the simulation process.

The definition of the printer structure includes parameters like the arrangement of the print heads in the printer. The coming print session is configured by defining the print job, as well as the method of printing (number of print passes, motion speed etc.). The configuration of the simulation process consists of defining all the actual parameters characterizing the printing process of a given printer. Any deviations from the ideal values of the parameters are specified in this section. For example, the actual position of the print heads or any motion errors during printing are defined in this section. Parameters of the simulation process are defined, including the resolution factor. The resolution factor is the ratio between the simulation file resolution and the printing resolution.

When running a simulation session, 3 xml files are fed to the simulation engine providing the parameters for the whole process.

The 3 dot button in the main screen is used to select an xml configuration file. Clicking the Edit button opens the file for editing in the ViPrint editor. Selecting a general configuration sets the same file for the 3 configuration sections.

Figure 10:
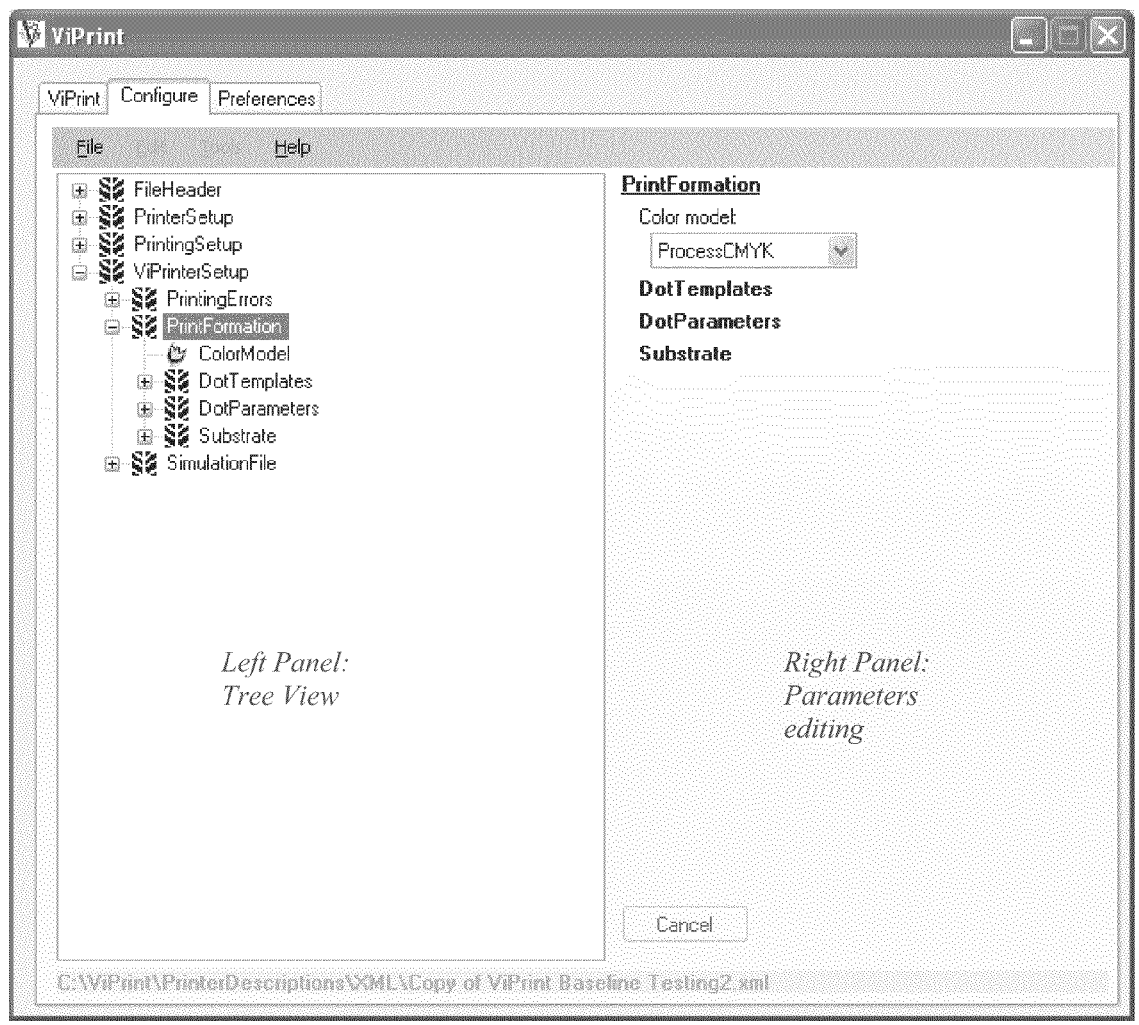
FIG. 10 is a screen capture of the editor screen of Viprint

The Editor tab (FIG. 10) is used to edit the XML files prior to running a simulation. ViPrint configuration files are specially formulated XML files. These files have a special format that facilitate the editing of a large number of parameters.

There are two ways to start the editor: either selecting the Editor tab or clicking on the Edit button next to the configuration files selection in the main screen. In the later case the editor is started with the corresponding XML file. The editor has standard features like Open, Save etc. After a file is edited it can be saved on disk and later selected for a simulation session.

XML files have a tree structure corresponding to a logical system that they describe (FIG. 11) The operator can navigate within the tree by moving along branches, expanding and collapsing as necessary. The left panel of the editor shows the tree structure of the file. The data parameters reside in the leaves of the tree. The right panel provides an expanded view of the current tree, enabling the editing of its leaves. There are different types of parameters, like text or number values, all of which can be modified in a convenient manner.

Figure 11:
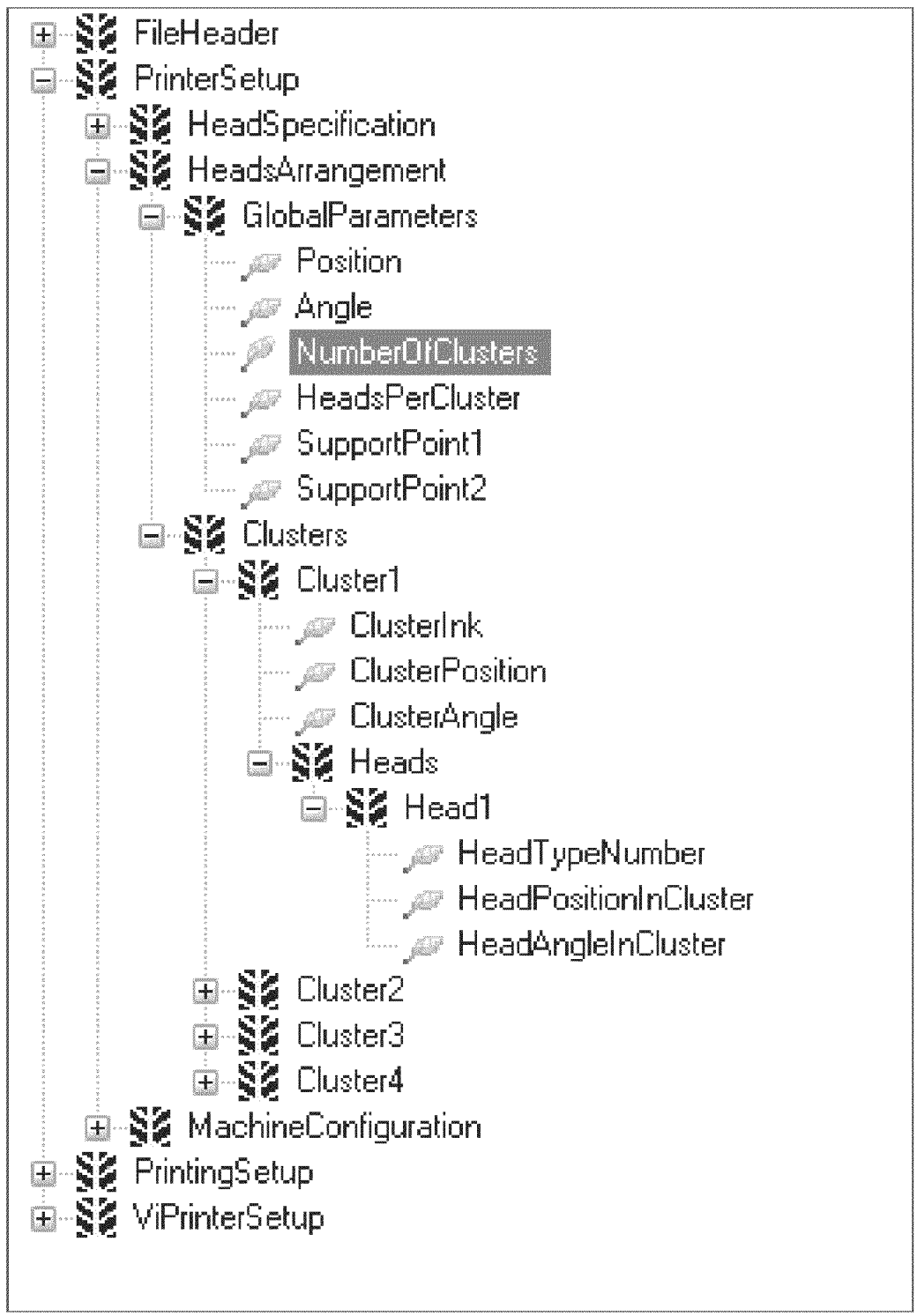
FIG. 11 illustrates the structure of Viprint XML files
Figure 12:
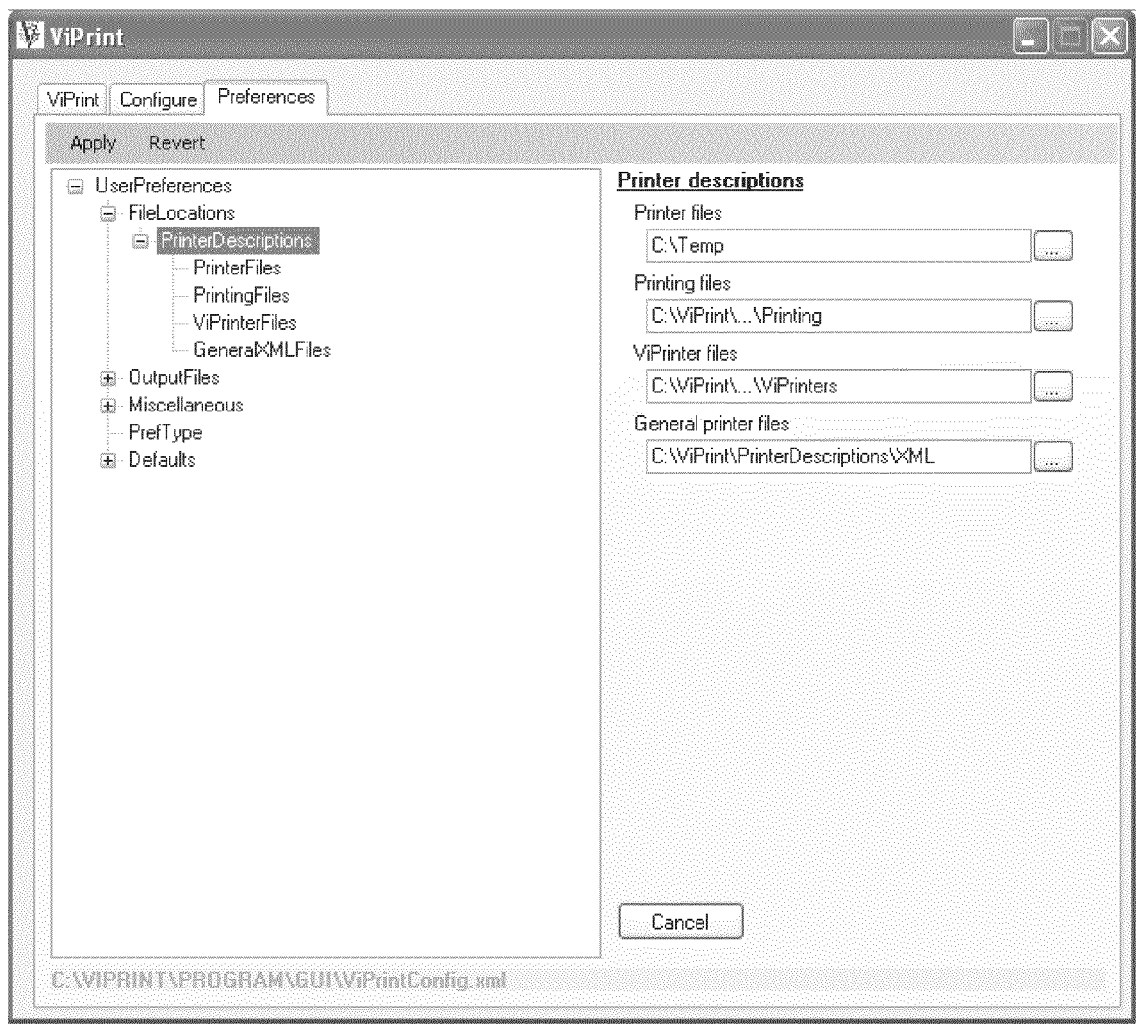
FIG. 12 is a screen capture of the preferences screen of ViPrint

The application preferences are arranged in a XML data file, similar to ViPrint configuration files (FIG. 11). It can therefore be edited in a similar manner using the same editor (FIG. 12). All working conventions of the editor apply also to the preferences editor. Clicking the Apply button activates the modifications. The Revert button cancels all changes since the beginning of the session or since the last time the Apply button was pressed.

Setting Parameters

Figure 13:
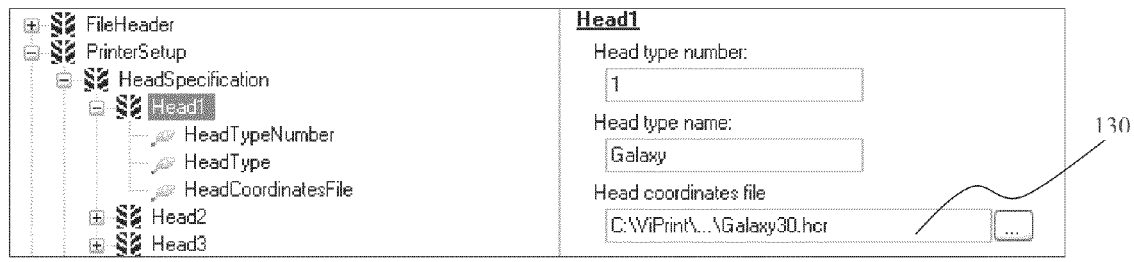
FIGS. 13-16 are screen captures of parameters entry dialogs of ViPrint
Figure 14:
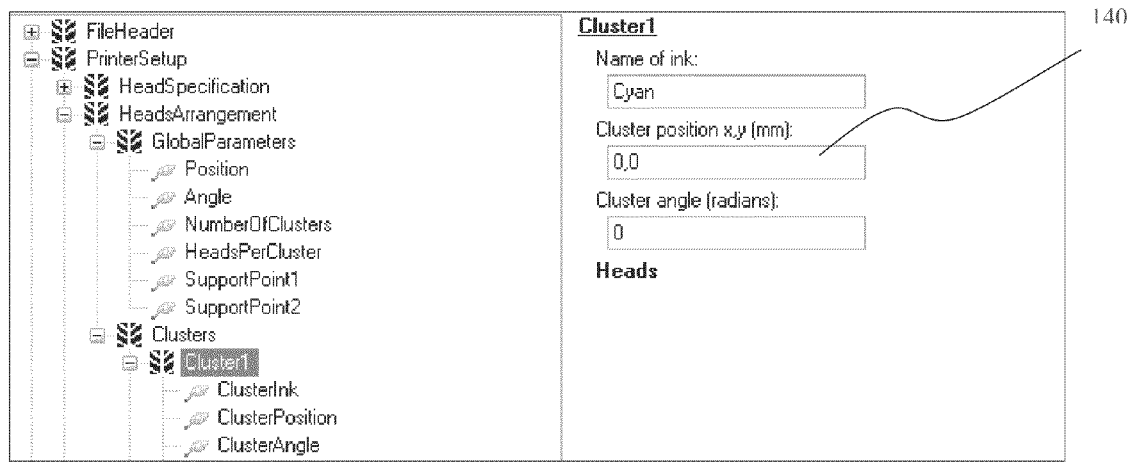
Figure 15:
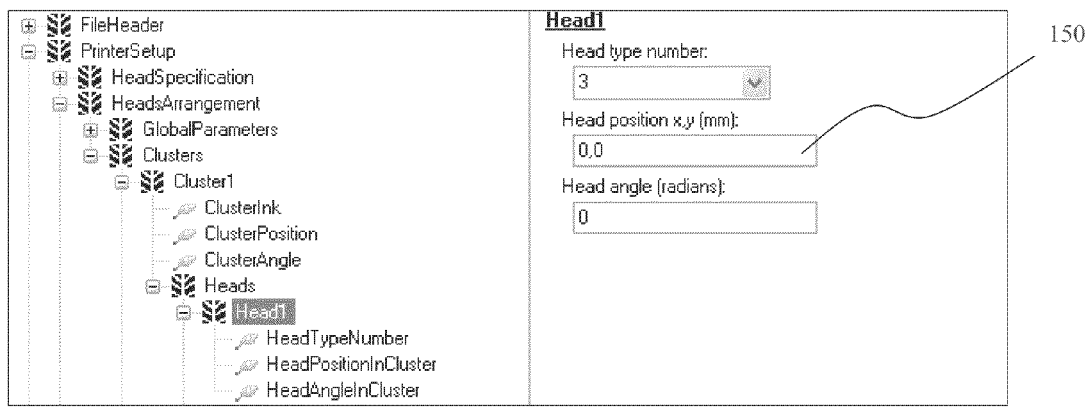
Figure 16:
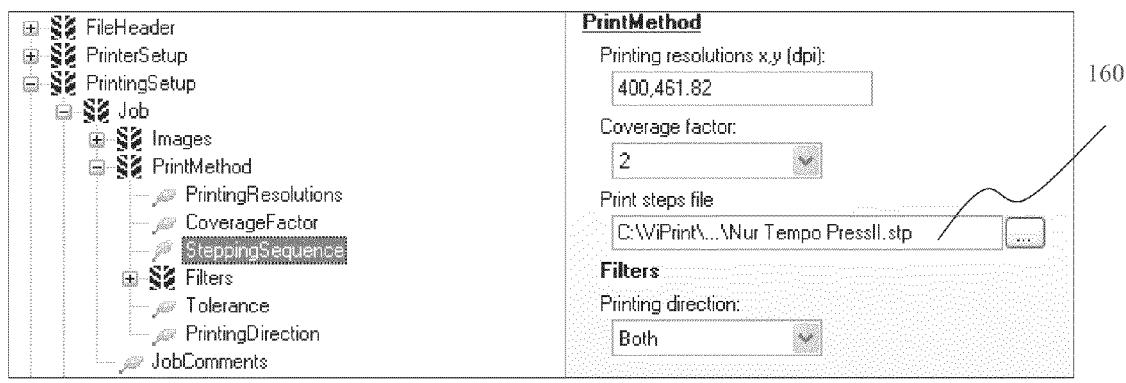

During a simulation session ViPrint uses many parameters characterizing the structure and operation of the simulated device. As mentioned above, these parameters are modified using ViPrint Editor. A few examples of ViPrint parameters editing are given below:
1. Nozzles coordinates. The coordinates of all nozzles of the print heads in the printer are defined. First, in a "Head Specification" section of the XML file the print head nozzle coordinates are defined, by pointing to a special head coordinates file (130) of FIG. 13. The print heads are arranged in clusters on the head carrier. The cluster position is specified in the Clusters section of the Global parameters section of the XML file (140) of FIG. 14. Similarly, the head position is specified within the cluster (150) of FIG. 15. Using all position parameters it is possible to calculate the position of each nozzle within the printer.
2. Slow axis motion steps. The slow axis motion steps are defined in the Print method section of the XML file (160) (FIG. 16). By pointing to a special stepping sequence file it is possible to specify all the slow axis motion steps of the coming simulation session.

ESSENTIALS OF THE INVENTION

It is herein acknowledged that the means and methods provided by the invention for simulating an image conversion device such as a printer can be adapted by a person skilled in the art to furnish means and methods for simulating the recording of an image on screen such as those produced by a display monitor. Furthermore, it is herein acknowledged that a person skilled in the art could, without undue experimentation, adapt the means and methods provided herein by the invention to simulate the transferring of a physical image into digital means such as that provided by a camera, scanner or video recording device.

It is herein acknowledged that a core principle of the invention is the use of base elements as "building bricks" for the simulation.

It is further herein acknowledged that a core principle is the pseudo analog handling of the base elements In the following description of the exemplary embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. The embodiments described herein are provided as non limiting examples. It is acknowledged herein that printing technologies to which the present invention provides a novel and comprehensive simulation solution include digital technologies such as laser, thermal and inkjet. Conventional technologies such as offset lithography and flexography are also well within the scope of the present invention. In other words, the invention is not limited to pure digital technologies.

It is envisaged that aspects and embodiments of the ViPrint invention will be applied to Drop on demand Inkjet printers including piezoelectric and thermal technology. It is a core objective of the invention to provide aspects and embodiments of the invention to Drop on demand Inkjet printer technology.

Inkjet printers technology development starts in the early 1960s. The first inkjet printing device was patented by Siemens in 1951, which led to the introduction of one of the first inkjet chart recorders.

The continuous inkjet printer technology was developed later by IBM in the 1970s. The continuous inkjet technology basis is to deflect and control a continuous inkjet droplet stream direction onto the printed media or into a gutter for recirculation by applying an electric field to previously charged inkjet droplets.

The drop-on-demand inkjet printer technology was led to the market in 1977 when Siemens introduced the PT-80 serial character printer. The drop-on-demand printer ejects ink droplets only when they are needed to print on the media. This method eliminates the complexity of the hardware required for the continuous inkjet printing technology. In these first inkjet printers ink drops are ejected by a pressure wave created by the mechanical motion of the piezoelectric actuators.

At the same time Canon developed the bubble jet printer technology, a drop-on-demand inkjet printing method where ink drops were ejected from the nozzle by the fast growth of an ink vapor bubble on the top surface of a small heater. Shortly thereafter, Hewlett-Packard independently developed a similar inkjet printing technology and named it thermal inkjet.

The most popular inkjet and bubble-jet printers use the serial printing process. Similarly to dot matrix printers, serial inkjet printers use print heads with a number of nozzles arranged in vertical columns. The printing process is the same as in dot matrix printers.

There are also available inkjet and bubble-jet printers analogous to line dot matrix printers for high speed printing applications.

The greatest advantages of inkjet printers are quiet operation, capability to produce color images even with photographic quality and the low capital cost.

The term "image conversion device" hereinafter refers to a device for transforming images from one form to another, be they optical physical, digital, virtual, three dimensional or two dimensional. The transformations can be for both input and output devices.

The term "emulating" hereinafter refers to the duplication of the functions of one system using a different system, so that the second system behaves like (and appears to be) the first system. It is acknowledged that in some embodiments of the invention some processes will be selected for emulation in a predetermined manner. In a given emulation input and output will be the same as in the original process. The most notable process for emulation in ViPrint is the nozzle mapping, which is the processing of the data, starting from an image file and ending up with a data stream that is fed to the print heads during the print passes.

The term "print head array" hereinafter refers to an arrangement of print heads on the print head carrier of the printer, comprising at least one print head.

The term "printing device" hereinafter refers to both digital printing devices and conventional printing presses.

The term "base element" hereinafter refers to the smallest unit that the system actually handles. In a digital system, there is a correlation between the basic data element and the physical base element. In the simulation, for each step of the process a base element is identified. The essence of the simulation is the tracing of the important attributes of the base element. In an inkjet system, the base element is the droplet, its transformations and its origins.

In the first step of the physical printing process, prior to drop ejection, the drop has not yet been defined and the base element is the nozzle out of which the drop will be ejected. The important attributes of the nozzle are its position, speed and shape, all affecting the drop ejection.

In the second step of the process, the drop has been ejected and the base element is the drop itself. The important attributes are the drop trajectory from the nozzle to the substrate, used to calculate the landing position of the drop on the substrate.

In the third step of the process, the drop has landed on the substrate and is transformed into a dot, which is now the base element. The important dot attributes are its position, shape, size and colour.

A method of simulating an inkjet printer is disclosed wherein the method comprises steps of a. emulating the machine nozzle mapping process using actual parameters
b. simulating selected process steps
c. setting a combination of ideal and actual parameter values for all structural and operational elements in the simulated device
d. distinguishing the effect on the visual image of the actual parameter values in comparison to the visual image created from the corresponding ideal parameter values It is herein acknowledged that all process steps whether emulated or simulated can correspond to actual steps implemented in the real machine or to steps which can be implemented for the real machine but are not actually there. It is therefore possible to simulate a printer that does not exist, partly or as a whole.

It is herein acknowledged that the principles outlined above can be applied to many image conversion devices. In the process of implementing a simulator for an image conversion device, the device process is analyzed, the process steps are identified and characterized. Base element and their attributes are identified and decisions are made as to which steps should be simulated and which should be emulated.

The simulation parameters are classified under two different classifications:
Structure/Operation
Ideal/Actual It is herein acknowledged that the structural parameters may include the basic machine configuration, the number of the print heads, the positions of the heads, the type of heads, the inks used in the print heads etc.

It is further acknowledged that operational parameters are those that may change between printing sessions. Such parameters include printing speed, the number and magnitude of the print passes, the printing direction, the height of the heads above the substrate, etc.

The design target of the machine is represented by ideal parameters. For example, for a particular printer the ideal position of print head #4 might be 12 mm from head #1 along the scanning axis. However, if the head is actually at 12.08 mm then this is the actual parameter. The actual parameter can be within the design tolerance or outside it, but in any case it is not the ideal value. Any mechanical or software or electronic system within the device may have deviations in their static structure and/or dynamic operation from the ideal or the nominal values.

In ViPrint, the data is prepared by an emulation process to the machine nozzle mapping process. As in the real process, the emulation is normally using the ideal parameters. In the process steps that are simulated, one can select either the ideal parameters or actual parameters of different systems in the machine. When selecting only ideal parameters the output very much resembles the input image. However, when using the actual parameters, the output is different from the input image as it reflects the machine discrepancies. For example, if a print head is shifted or rotated, then the output image is "noisy" and banding might appear.

A normal practice of operation of the simulator is to keep some parameters in their ideal value while set others to their actual value. This way one tests the effect of those parameters that have the actual values. The operator is free to determine the values of ViPrint parameters.

It is an aspect of the invention to provide a method for simulating the function of an image conversion device. The aforesaid method comprises steps of reading input image data, recording the physical transformations of the base elements in at least one process step, emulating a predetermined number of processes, recording the final states of the base elements, collecting the base elements states following the last simulation step, transforming said collection into the simulation file and printing or displaying said simulation file.

It is another aspect of the invention to provide a method as defined above. The method further comprises steps of defining the image conversion device structure, characterizing the current imaging session, establishing the actual device structure, defining the actual device operation, defining the simulation parameters. The method defined above further comprises initializing simulation by inputting the aforementioned steps to the simulation.

It is a further aspect of the invention to provide a method as defined above wherein the image conversion device is a printing device.

It is a further object of the invention to provide a method as defined above wherein the image conversion device is an inkjet printer It is a further object of the invention to provide a method as defined above wherein the image conversion device is a drop on demand inkjet printer It is a further object of the invention to provide a method as defined above wherein the image conversion device is a continuous inkjet printer.

It is a further object of the invention to provide a method as defined above wherein defining of the image conversion device structure includes steps of defining any combination of ideal and actual parameters including the basic machine configuration, number and type of print heads, position and orientation of print heads, ink used in the print heads or any other structural parameter of the ink jet printer.

It is a further object of the invention to provide a method as defined above wherein the defining of the device operation includes steps of defining ideal and actual operational parameters including printing speed, number and position of printing passes per printing session, printing direction, height of heads above substrate or any other operational parameters associated with the ideal and actual device operation.

It is a further object of the invention to provide a method as defined above wherein the defining of the simulation parameters includes defining parameters relating to the simulation process and generation of the simulation file including resolution factor and colour depth.

It is a further object of the invention to provide a method as defined above wherein the method further comprising steps of reading the original image data, processing the original image data according to the data interface of the print heads and the printing flow, transferring print pass data to a data structure representing the print heads array, simulating the static structure of the print heads array, simulating the relative motion between said heads array and the substrate along the slow axis with respect to the start position of the coming print pass, simulating the relative scanning motion between said heads array and the substrate along the fast axis, and recording the XYZ position and velocity of each nozzle in the print heads array each time drops are ejected during the motion along the fast axis. Further steps include calculating the drops trajectory to the substrate, selecting a predetermined ink-substrate interaction model, calculating parameters selected from a group consisting of position coordinates, shape, size and colour of said ink dot on the substrate at time that ink is fixed on the substrate, repeating the appropriate steps until the whole image is reproduced on the substrate, generating an output image file from the final appearance of the ink on the substrate thereby making up a complete image from individual dots, storing the output file on disk or other media and displaying or printing the file.

It is a further object of the invention to provide a method as described above, wherein the relative motion along the slow axis is selected from a group comprising continuous motion, stepwise motion or no motion at all.

It is a further object of the invention to provide a method for simulating the function of an inkjet image conversion device under different working conditions, the method comprises steps of;

a. obtaining a simulator incorporating a data module
b. adapting the data module to comprise a data communication unit, data processing emulator and a data storage unit,
c. further obtaining a nozzle tracing module (NTM), further incorporating at least a slow axis tracking unit and at least a fast axis tracking unit into said NTM
d. further obtaining a drop flight tracing unit
e. further obtaining a dot interaction tracing unit and
f. further obtaining a print file generator
g. configuring the modules and units to an appropriate predetermined inkjet printer configuration
h. operating the configuration so as to simulate the function of an inkjet printer when the simulator is in operating mode.

It is a further object of the invention to disclose a system for simulating the function of an image conversion device wherein the system comprises means for reading input image data, means for recording the physical transformations of the base elements in at least one process step, means for emulating a predetermined number of processes, means for recording the final states of the base elements, means for collecting the base elements states following the last simulation step means for transforming said collection into the simulation file and
means for printing or displaying the images file.

It is a further object of the invention to disclose the system described above, wherein the system further comprises means for defining the image conversion device structure, means for characterizing the current imaging session, means for establishing the actual device structure, means for defining the actual device operation wherein the method further comprises means for initializing the simulation by inputting above steps to the simulation.

It is a further object of the invention to disclose the system described above wherein the image conversion device is a printer.

It is a further object of the invention to disclose the system described above wherein the image conversion device is an inkjet printer It is a further object of the invention to disclose the system described above wherein said image conversion device is a drop on demand inkjet printer It is a further object of the invention to disclose the system described above wherein the image conversion device is a continuous inkjet printer.

It is a further object of the invention to disclose the system described above wherein the means of defining said image conversion device structure includes means of defining any combination of ideal and actual parameters including the basic machine configuration, number and type of print heads, position and orientation of print heads, ink used in the print heads or any other structural parameter of said ink jet printer.

It is a further object of the invention to disclose the system described above wherein said means of defining the device operation includes means of defining ideal and actual operational parameters including printing speed, number and position of printing passes per printing session, printing direction, height of heads above substrate or any other operational parameters associated with said ideal and actual device operation.

It is a further object of the invention to disclose the system described above wherein the means for initializing said simulation parameters includes means for defining parameters relating to the simulation process and generation of simulation files, the parameters including resolution factor and colour depth.

It is a further object of the invention to disclose the system described above wherein the system further comprises
   a. means of reading the original image data
   b. means of processing the original image data according to the data interface of the print heads and the printing flow
   c. means of transferring print pass data to a data structure representing the print heads array
   d. means of simulating the static structure of the print heads array
   e. means of simulating the relative motion between the heads array and the substrate along the slow axis with respect to the start position of the coming print pass
   f. means of simulating the relative scanning motion between the heads array and the substrate along the fast axis
   g. means of recording the XYZ position and velocity of each nozzle in the print heads array each time drops are ejected during the motion along the fast axis
   h. means of calculating the drops trajectory to the substrate
   i. means of selecting a predetermined ink-substrate interaction model
   j. means of calculating parameters selected from a group consisting of position coordinates, shape, size and colour of the ink dot on said substrate at time that ink is fixed on the substrate
   k. means of generating an output image file from the final appearance of the ink on the substrate thereby making up a complete image from individual dots
   l. means of storing the output file on disk or other media
   m. means of displaying or printing the file.

It is a further object of the invention to disclose the system described above wherein the system is provided with means of simulating the relative motion between the heads array and the substrate along the slow axis with respect to the start position of the coming print pass, further wherein the relative motion along the slow axis is selected from a group comprising continuous motion, stepwise motion or no motion at all.

It is a further object of the invention to disclose the system described above wherein the system comprises
   a. means of emulating the machine nozzle mapping process using actual parameters
   b. means of simulating selected process steps
   c. means of setting a combination of ideal and actual parameter values for all structural and operational elements in the simulated device
   d. means of distinguishing the effect on the visual image of the actual parameter values in comparison to the visual image created from the corresponding ideal parameter values It is a further object of the invention to disclose the system useful for simulating the function of an inkjet image conversion device under different working conditions, the system comprising
   a. a simulator incorporating a data module, the data module further comprising a data communication unit, data processing emulator and a data storage unit,
   b. a nozzle tracing module (NTM), said NTM further comprising at least one slow axis tracking unit and at least one fast axis tracking unit
   c. a drop flight tracing unit
   d. a dot interaction tracing unit and
   e. a print file generator
   f. means for configuring said modules and units to an appropriate predetermined inkjet printer configuration
means for operating the above mentioned configuration so as to simulate the function of an inkjet printer when the simulator is in operating mode. While a number of exemplary aspects and embodiments have been discussed above, those of skill in the art will recognize certain modifications, permutations, additions and sub-combinations thereof. It is therefore intended that the following appended claim and claims hereafter introduced, be interpreted to include all such modifications, permutations, additions and sub-combinations as are within their true spirit and scope.

We claim:

1. A method for simulating the function of an image conversion device wherein said image conversion device is an inkjet printer and wherein said method comprises steps of
   a. reading input image data;
   b. recording the physical transformations of the base elements in at least one process step;
   c. emulating a predetermined number of processes;
   d. recording the final states of the base elements;
   e. collecting the base elements states following the last simulation step;
   f. transforming said collection into the simulation file; and,
   g. printing or displaying said simulation file;
said method further comprises the steps of:
   h. reading the original image data;
   i. processing said original image data according to the data interface of the print heads and the printing flow;
   j. transferring print pass data to a data structure representing the print heads array;
   k. simulating the static structure of the print heads array;
   l. simulating the relative motion between said heads array and the substrate; along the slow axis with respect to the start position of the coming print pass;
   m. simulating the relative scanning motion between said heads array and the substrate along the fast axis;
   n. recording the XYZ position and velocity of each nozzle in said print heads array each time drops are ejected during the motion along the fast axis;
   o. calculating said drops trajectory to the substrate;
   p. selecting a predetermined ink-substrate interaction model;
   q. calculating parameters selected from a group consisting of position coordinates, shape, size and colour of said ink dot on said substrate at time that ink is fixed on said substrate;
   r. repeating steps j through q until the whole image is reproduced on said substrate;
   s. generating an output image file from the final appearance of said ink on said substrate thereby making up a complete image from individual dots;
   t. storing said output file on disk or other media; and,
   u. displaying or printing said file.

2. The method according to claim 1, wherein said method further comprises steps of
   a. defining the image conversion device structure;
   b. characterizing the current imaging session;
   c. establishing the actual device structure;
   d. defining the actual device operation; and,
   e. defining the simulation parameters;

wherein said method further comprises initializing said simulation by inputting steps a-e to said simulation.

3. The method according to claim 1, wherein said image conversion device is a drop on demand inkjet printer.

4. The method according to claim 2, wherein said image conversion device is a drop on demand inkjet printer.

5. The method according to claim 1, wherein said image conversion device is a continuous inkjet printer.

6. The method according to claim 2, wherein said image conversion device is a continuous inkjet printer.

7. The method according to claim 1, wherein said defining of said image conversion device structure includes the step of defining any combination of ideal and actual parameters including the basic machine configuration, number and type of print heads, position and orientation of the print heads carrier, print heads, ink used in the print heads or any other structural parameter of said ink jet printer.

8. The method according to claim 1, wherein said defining of said actual device operation includes steps of defining ideal and actual operational parameters including input image, printing resolutions, printing speed, number and position of printing passes per printing session, printing direction, height of heads above substrate or any other operational parameters associated with said ideal and actual device operation.

9. The method according to claim 1, wherein said defining of said simulation parameters includes defining parameters relating to the simulation process and generation of said simulation file including resolution factor and colour depth.

10. The method according to claim 1, wherein said relative motion along the slow axis is selected from a group comprising continuous motion, stepwise motion or no motion at all.

11. The method according to claim 2, wherein said relative motion along the slow axis is selected from a group comprising continuous motion, stepwise motion or no motion at all.

12. A method for simulating the function of an inkjet image conversion device under different working conditions, said method comprising steps of
   a. obtaining a simulator incorporating a data module;
   b. adapting said data module to comprise a data communication unit, data processing emulator and a data storage unit;
   c. further obtaining a nozzle tracing module (NTM), further incorporating at least a slow axis tracking unit and at least a fast axis tracking unit into said NTM;
   d. further obtaining a drop flight tracing unit;
   e. further obtaining a dot interaction tracing unit;
   f. further obtaining a print file generator;
   g. configuring said modules and units to an appropriate predetermined inkjet printer configuration; and,
   h. operating said configuration so as to simulate the function of an inkjet printer when said simulator is in operating mode, wherein said operating mode includes the steps of
      reading input image data;
      recording the physical transformations of the base elements in at least one process step;
      emulating a predetermined number of processes;
      recording the final states of the base elements;
      collecting the base elements states following the last simulation step;
      transforming said collection into the simulation file;
      printing or displaying said simulation file;
      reading the original image data;
      processing said original image data according to the data interface of the print heads and the printing flow;
      transferring print pass data to a data structure representing the print heads array;
      simulating the static structure of the print heads array;
      simulating the relative motion between said heads array and the substrate; along the slow axis with respect to the start position of the coming print pass;
      simulating the relative scanning motion between said heads array and the substrate along the fast axis;
      recording the XYZ position and velocity of each nozzle in said print heads array each time drops are ejected during the motion along the fast axis;
      calculating said drops trajectory to the substrate;
      selecting a predetermined ink—substrate interaction model;
      calculating parameters selected from a group consisting of position coordinates, shape, size and colour of said ink dot on said substrate at time that ink is fixed on said substrate;
      repeating steps j through q until the whole image is reproduced on said substrate;
      generating an output image file from the final appearance of said ink on said substrate thereby making up a complete image from individual dots;
      storing said output file on disk or other media; and,
      displaying or printing said file.

13. A system for simulating the function of an image conversion device wherein said image conversion device is an inkjet printer and wherein said system comprises:
   a. means for reading input image data;
   b. means for recording the physical transformations of the base elements in at least one process step;
   c. means for emulating a predetermined number of processes;
   d. means for recording the final states of the base elements;
   e. means for collecting the base elements states following the last simulation step;
   f. means for transforming said collection into the simulation file;
   g. means for printing or displaying images said file;
   h. means of reading the original image data;
   i. means of processing said original image data according to the data interface of the print heads and the printing flow;
   j. means of transferring print pass data to a data structure representing the print heads array;
   k. means of simulating the static structure of the print heads array;
   l. means of simulating the relative motion between said heads array and the substrate along the slow axis with respect to the start position of the coming print pass;
   m. means of simulating the relative scanning motion between said heads array and the substrate along the fast axis;
   n. means of recording the XYZ position and velocity of each nozzle in said print heads array each time drops are elected during the motion along the fast axis;
   o. means of calculating said drops trajectory to the substrate;
   p. means of selecting a predetermined ink-substrate interaction model;
   q. means of calculating parameters selected from a group consisting of position coordinates, shape, size and colour of said ink dot on said substrate at time that ink is fixed on said substrate;

r. means of generating an output image file from the final appearance of said ink on said substrate thereby making up a complete image from individual dots;
s. means of storing said output file on disk or other media; and,
means of displaying or printing said file.

14. The system according to claim 13, wherein said system further comprises
a. means for defining the image conversion device structure;
b. means for characterizing the current imaging session;
c. means for establishing the actual device structure;
d. means for defining the actual device operation; and,
e. means for defining the simulation parameters;
wherein said method further comprises means for initializing said simulation by inputting steps a-d to said simulation.

15. The system according to claim 13, wherein said image conversion device is a drop on demand inkjet printer.

16. The system according to claim 13, wherein said image conversion device is a continuous inkjet printer.

17. The system according to claim 14, wherein said image conversion device is a continuous inkjet printer.

18. The system according to claim 13, wherein said means of defining said image conversion device structure includes means of defining any combination of ideal and actual parameters including the basic machine configuration, number and type of print heads, position and orientation of print heads, ink used in the print heads or any other structural parameter of said ink jet printer.

19. The system according to claim 14, wherein said means of defining said image conversion device structure includes means of defining any combination of ideal and actual parameters including the basic machine configuration, number and type of print heads, position and orientation of print heads, ink used in the print heads or any other structural parameter of said ink jet printer.

20. The system according to claim 13, wherein said means of defining said actual device operation includes means of defining ideal and actual operational parameters including printing speed, number and position of printing passes per printing session, printing direction, height of heads above substrate or any other operational parameters associated with said ideal and actual device operation.

21. The system according to claim 14, wherein said means of defining said actual device operation includes means of defining ideal and actual operational parameters including printing speed, number and position of printing passes per printing session, printing direction, height of heads above substrate or any other operational parameters associated with said ideal and actual device operation.

22. The system according to claim 13, wherein said means for initializing said simulation parameters includes means for defining parameters relating to the simulation process and generation of simulation files, said parameters including resolution factor and colour depth.

23. The system according to claim 14, wherein said means for initializing said simulation parameters includes means for defining parameters relating to the simulation process and generation of simulation files, said parameters including resolution factor and colour depth.

24. The system according to claim 13, wherein said system is provided with means of simulating the relative motion between said heads array and said substrate along the slow axis with respect to the start position of the coming print pass further wherein said relative motion along the slow axis is selected from a group comprising continuous motion, stepwise motion or no motion at all.

25. The system according to claim 14, wherein said system is provided with means of simulating the relative motion between said heads array and said substrate along the slow axis with respect to the start position of the coming print pass further wherein said relative motion along the slow axis is selected from a group comprising continuous motion, stepwise motion or no motion at all.

26. The system according to claim 13 wherein said system additionally comprises
a. means of emulating the machine nozzle mapping process using actual parameters;
b. means of simulating selected process steps;
c. means of setting a combination of ideal and actual parameter values for all structural and operational elements in the simulated device; and,
d. means of distinguishing the effect on the visual image of said actual parameter values in comparison to said visual image created from corresponding said ideal parameter values.

27. The system according to claim 14 wherein said system additionally comprises
a. means of emulating the machine nozzle mapping process using actual parameters;
b. means of simulating selected process steps;
c. means of setting a combination of ideal and actual parameter values for all structural and operational elements in the simulated device; and,
means of distinguishing the effect on the visual image of said actual parameter values in comparison to said visual image created from corresponding said ideal parameter values.

28. A system useful for simulating the function of an inkjet image conversion device under different working conditions, said system comprising
a. a simulator incorporating a data module, said data module further comprising a data communication unit, data processing emulator and a data storage unit;
b. a nozzle tracing module (NTM), said NTM further comprising at least one slow axis tracking unit and at least one fast axis tracking unit;
c. a drop flight tracing unit;
d. a dot interaction tracing unit;
e. a print file generator;
f. means for configuring said modules and units to an appropriate predetermined inkjet printer configuration; and,
g. means for operating said configuration so as to simulate the function of an inkjet printer when said simulator is in operating mode, wherein said system further includes:
h. means for reading input image data;
i. means for recording the physical transformations of the base elements in at least one process step;
j. means for emulating a predetermined number of processes;
k. means for recording the final states of the base elements;
l. means for collecting the base elements states following the last simulation step;
m. means for transforming said collection into the simulation file;
n. means for printing or displaying images said file;
o. means for reading the original image data;

p. means for processing said original image data according to the data interface of the print heads and the printing flow;
q. means for transferring print pass data to a data structure representing the print heads array;
r. means for simulating the static structure of the print heads array;
s. means for simulating the relative motion between said heads array and the substrate along the slow axis with respect to the start position of the coming print pass;
t. means for simulating the relative scanning motion between said heads array and the substrate along the fast axis;
u. means for recording the XYZ position and velocity of each nozzle in said print heads array each time drops are ejected during the motion along the fast axis;
v. means for calculating said drops trajectory to the substrate;
w. means for selecting a predetermined ink-substrate interaction model;
x. means for calculating parameters selected from a group consisting of position coordinates, shape, size and colour of said ink dot on said substrate at time that ink is fixed on said substrate;
y. means for generating an output image file from the final appearance of said ink on said substrate thereby making up a complete image from individual dots;
z. means for storing said output file on disk or other media; and, means for simulating displaying or printing said file.

* * * * *